Feb. 16, 1965   A. J. JOHNSTON   3,169,316
VEGETABLE PEELER
Filed Jan. 31, 1964

INVENTOR
ALVA J. JOHNSTON

United States Patent Office 3,169,316
Patented Feb. 16, 1965

3,169,316
VEGETABLE PEELER
Alva J. Johnston, Glacier County, Cut Bank, Mont.
Filed Jan. 31, 1964, Ser. No. 341,660
3 Claims. (Cl. 30—279)

This invention relates generally to a paring knife and more particularly to a knife for peeling vegetables having curved configurations.

The common paring knife or potato peeler provides a knife blade which is adapted for following the contour of an object by virtue of the blade being pivotally mounted in the handle. This particular device, however, cannot provide a wide cut while peeling a vegetable having a rounded cross sectional configuration. This disadvantage is obvious and inherent in the structure thereof by reason of the straight, nonresilient blade employed therewith. It is obvious, therefore, that this prior known device cannot provide adequate cutting coverage per cutting stroke. The user is thus required to make many cuts in order to peel a particular round shaped vegetable or object.

Other paring knives include such structures as a resilient blade having a slight arcuate shape and an arcuately shaped guide connected with and supporting the blade on the handle. The spacing between the guide and the blade provides the desired thickness of the cut and the blade is adjustable to provide adjustability in the thickness. Such structures, however, require that the blade be fixed in an arcuate position and retain that position during the cutting stroke. It is well known that vegetables, as for instance, potatoes, vary in their arcuate configurations from end to end. Therefore, since such a device cannot follow the varying contour of an object it is cutting, it cannot perform its intended function to an optimum.

In both of the aforementioned devices the cut produced is capable of following a longitudinal contour. The latter device is capable of producing a wider cut than the former device by virtue of its arcuate mounting, but like the former device, is incapable of following a varying lateral configuration of a vegetable. Furthermore, such prior devices tend to produce a deeper cut with increased pressure on the vegetable. This disadvantage results in binding of the blade and waste of the excessive food removed with the peeling.

It is apparent therefore, that a great need exists for a paring knife which can follow the two dimensional contoured configuration of a vegetable or object it is cutting. Furthermore such a device is required which does not necessitate the need of constant adjustment of the elements for determining the relative thickness of each cut or the particular transverse contour to be followed.

It is, therefore, one primary object of this invention to provide a vegetable peeler which will follow the contour of an object being cut.

It is another object of this invention to provide a vegetable peeler which will shape itself to the configuration of the vegetable or object being cut.

Another object of the present invention is to provide a vegetable peeler which will make a wide cut on the object.

Still another object of the present invention is to provide a vegetable peeler which is of simple design and construction.

Yet another object of the present invention is to provide a vegetable peeler which slightly reduces its depth of cut with increased pressure thereon.

These and other objects will be more fully realized from the novel structure of the present invention, which generally includes a frame member, a pair of support pins secured to the frame, and a knife blade disposed between the pins. The knife blade is resilient to provide bending movement thereof to conform to an object being cut. The frame is secured to a handle for manipulation of the device.

The present invention, however, will be more fully realized and understood from the following detailed description when taken in conjunction with the accompanying drawing wherein.

Like reference numerals throughout the various views of the drawings are intended to designate the same or similar structure.

Figure 4:
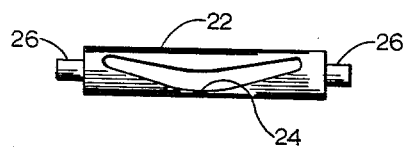
FIGURE 4 is an enlarged detailed view of one blade supporting pin employed in the present invention.

With reference to the drawings in detail, there is shown therein the vegetable peeler of the present invention generally designated by the reference numeral 10. A frame member 12 includes a pair of arcuately shaped arms 14 and 16 joined at one end thereof by a U-shaped portion 18. The U-shaped end portion of frame 12 is supported by a handle 20. Secured between respective ends of arms 14 and 16 are a pair of blade supporting pins 22 which include, as shown in FIGURE 4, a longitudinal slot 24 therethrough, and projecting bearing members 26. Bearing members 26 are received in holes 28 in the ends of arms 14 and 16.

Figure 1:
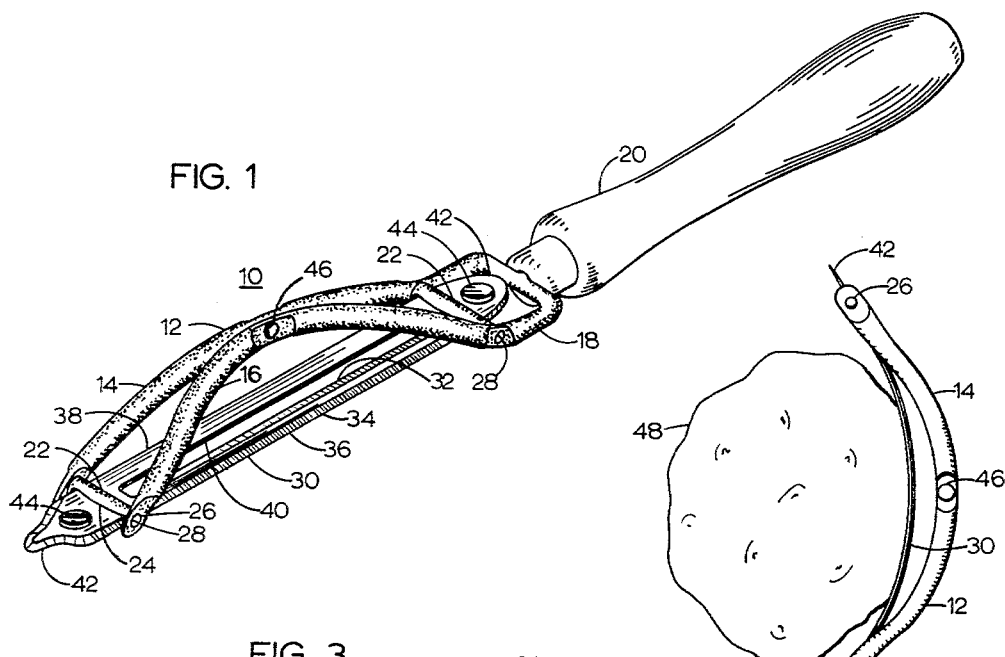
FIGURE 1 is a perspective view of the present invention.
Figure 3:
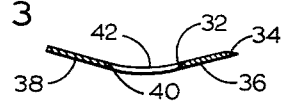
FIGURE 3 is an enlarged sectional view taken through the blade when in the position shown in FIGURE 1.

A blade 30 includes an inner knife edge 32 and an outer knife edge 34 on a knife portion 36 thereof. A runner portion 38 includes a rounded edge 40 disposed in spaced relationship from knife edge 32. Knife portion 36 is secured to runner portion 38 at respective ends thereof by end portions 42 of blade 30. As shown in FIGURES 1 and 3, it can be seen that blade 30 is constructed from an arcuately shaped strip having a longitudinal cutout portion through the center and ground to provide edges 32, 34, and 40.

Slot 24 in each pin 22 is conformably shaped to the cross sectional configuration of blade 30. The blade is slidably mounted at respective ends thereof in slots 24 of each pin. End portions 42 of the blade extending through the slots include a stop means 44. The stop means may include a rivet or similar structure secured to the blade or any suitable raised structure for limiting sliding movement of the blade in slots 24. As shown, the stops 44 are spaced a predetermined distance from the pins or at a greater distance from one another than the space provided between the pins.

The entire blade supporting structure including frame 12 and pins 22 is rigidly connected by means of end portion 18 and a rivet 46 connecting the mid points of arms 12 and 14. The arms, being of rigid material, hold pins 22 in holes 28 for providing the necessary support to blade 30.

Figure 2:
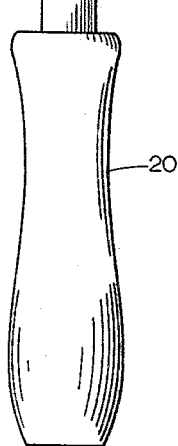
FIGURE 2 is a side elevational view of the invention illustrated in peeling a vegetable.

The blade is constructed of a resilient material and is biased to the position shown in FIGURE 1 and disposed for bending to the arcuate position shown in FIGURE 2. The stops limit the bending movement of the blade from bending beyond the position shown in FIGURE 2. Bearing members 26 are disposed in holes 28 for pivotal mounting of the end portions 42 of the blade for allowing the binding movement thereof. This mounting eliminates binding between the blade and support pins 22.

As shown in FIGURE 2, blade 30 conforms in shape to a vegetable, as shown by the potato designated with the numeral 48. When blade 30 bends to conform in shape to the vegetable, the blade tends to flatten slightly, thus reducing the cutting angle of edge 32 somewhat. This flattening of the blade is inherent in the structure thereof due to its arcuate configuration ad resilient characteristics. This novel function produces a unique result which is not exhibited in prior structures. That is, when a force is exerted on the blade, excessive material is not removed from the surface of the object being cut as in prior devices. In the present invention, when a force is exerted to bend the blade around the object being cut, an excessively deep cut does not result, since the angle of the knife edge is reduced.

Figure 5:
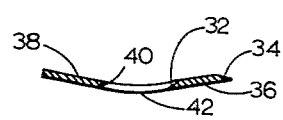
FIGURE 5 is another enlarged sectional view taken through the blade when in the position shown in FIGURE 2.

This flattening of the knife blade is illustrated by the sectional view thereof shown in FIGURE 5. Slots 24 in the supporting pins are conformably shaped to allow for this flattening action of the blade.

In operation, the device is placed on a vegetable and a small force is exerted to bend blade 30 around the contour of the object. The device is moved in cutting relationship with the vegetable to remove a substantially wide peeling therefrom. It can be seen that any conformity to longitudinal changes in the configuration of the vegetable which cannot be sensed and corrected for by the hand, the blade will adapt to, because of the resilient material employed therein. That is, the device in operation gages the depth of each cut by the angle of the knife edge 32 and the relative spacing thereof with runner portion 38. Since the runner portion is resilient, it may bend at its mid portion away from the knife portion, thus allowing a deeper cut when necessary. This action will result only when runner 38 engages a raised portion of the vegetable and bends to slide thereover. It is apparent that this will not produce a deep cut along a substantial length, since bending of the runner portion will cause the knife edge angle to decrease.

As shown in FIGURE 1, one or both of stop means 44 may be provided by a screw threaded into the end of the blade. This structure allows removal of blade 30 for facilitating several novel features. The handle, frame, and pins of the device can be constructed sufficiently sturdy to withstand many years of use. The blade however, due to wear of the knife edge, may require replacement from time to time. Such replacement is easily accomplished by removal of screw 44 and extraction of the blade from the slots in the pins.

Furthermore, it may be desired to change the cutting direction of the device, as for changing from the left hand to the right hand. This reversal of the blade may, therefore, also be accomplished easily and quickly by removal of screw 44.

If desired, rounded edge 40 of blade 30 can be ground to a knife edge while retaining its runner characteristics for knife edge 32. Also, the device can be employed for removing eyes from potatoes by means of exposed end portion 42 of the blade. Furthermore, knife edge 34 can be employed as a common knife since the frame member is spaced therefrom and will not interfere with its function.

The principles of the invention explained in connection with the specific exemplification thereon will suggest many other applications and modifications of the same. It is accordingly desired that, in construing the breadth of the appended claims they shall not be limited to the specific details shown and described in connection with the exemplification thereof.

What is claimed is:

1. A vegetable peeler comprising a frame member, a pair of support pins each having a longitudinal slot therethrough and each pivotally mounted at a respective end of said frame member, a resilient blade having each end thereof slidably mounted in a respective slot and biased in a straight line position therebetween, said blade disposed for movement to an arcuate position between said pins, means for limiting the movement of said blade to the arcuate position thereof, and a handle secured to said frame.

2. The vegetable peeler of claim 1 wherein said blade includes a runner portion and a knife portion in spaced relationship to one another and secured together by the end portions of said blade.

3. The vegetable peeler of claim 2 wherein said knife portion includes a pair of knife edges at each side thereof.

References Cited by the Examiner
UNITED STATES PATENTS

| | | | |
|---|---|---|---|
| 343,522 | 6/86 | Jordan | 30—279 |
| 658,774 | 10/00 | Grier | 30—279 |
| 2,083,368 | 6/37 | Gambino | 30—279 X |
| 2,228,572 | 1/41 | Lofgren | 30—329 X |

WILLIAM FELDMAN, *Primary Examiner.*

MILTON S. MEHR, *Examiner.*